United States Patent
Yunus et al.

(10) Patent No.: US 7,429,841 B2
(45) Date of Patent: Sep. 30, 2008

(54) METHOD AND APPARATUS FOR MOVABLE ELEMENT POSITION DETECTION IN AN ELECTRICALLY COMMUTATED MACHINE

(75) Inventors: Haroon I. Yunus, New Hartford, CT (US); Russel H. Marvin, Goshen, CT (US); Bumsuk Won, Avon, CT (US)

(73) Assignee: The Berquist Torrington Company, Chanhassen, MN (US)

( * ) Notice: Subject to any disclaimer, the term of this patent is extended or adjusted under 35 U.S.C. 154(b) by 63 days.

(21) Appl. No.: 10/956,404

(22) Filed: Sep. 30, 2004

(65) Prior Publication Data

US 2007/0126386 A1    Jun. 7, 2007

Related U.S. Application Data

(60) Provisional application No. 60/508,412, filed on Oct. 2, 2003.

(51) Int. Cl.
*H02P 6/00*    (2006.01)
(52) U.S. Cl. .......................... 318/400.01; 318/400.04; 318/400.14; 318/400.35; 318/606; 318/599

(58) Field of Classification Search ................. 318/254, 318/138, 439, 400.01, 400.04, 400.14, 400.35, 318/599, 606
See application file for complete search history.

(56) References Cited

U.S. PATENT DOCUMENTS

| | | | | |
|---|---|---|---|---|
| 5,134,349 A | * | 7/1992 | Kruse | 318/254 |
| 5,345,156 A | * | 9/1994 | Moreira | 318/400.04 |
| 5,422,570 A | * | 6/1995 | Moreira | 324/177 |
| 5,473,240 A | * | 12/1995 | Moreira | 318/801 |
| 5,481,166 A | * | 1/1996 | Moreira | 318/400.04 |
| 5,569,994 A | * | 10/1996 | Taylor et al. | 318/700 |
| 5,796,194 A | * | 8/1998 | Archer et al. | 310/68 B |
| 6,081,091 A | * | 6/2000 | Mitchell et al. | 318/685 |
| 6,100,656 A | * | 8/2000 | El-Sadi et al. | 318/254 |
| 6,555,977 B1 | * | 4/2003 | Du et al. | 318/254 |
| 2004/0000885 A1 | * | 1/2004 | Shao | 318/254 |

* cited by examiner

*Primary Examiner*—Rita Leykin
(74) *Attorney, Agent, or Firm*—Haugen Law Firm PLLP; Frederick W. Niebuhr; Mark J. Burns

(57) ABSTRACT

A method and circuit for detecting the position of the movable element of an electrically commutated machine. The method and apparatus allow detection of the back electromagnetic force (BEMF) waveform with all legs of the machine energized by mathematically removing the applied voltage from the measured voltage across the phases.

25 Claims, 5 Drawing Sheets

Sample Block Diagram of a Digital Implementation

Figure 1 : Inverter connections to a 3 phase brushless DC motor. The motor is represented by its equivalent electrical model.

Figure2: Sample Block diagram to compute the back emf voltage

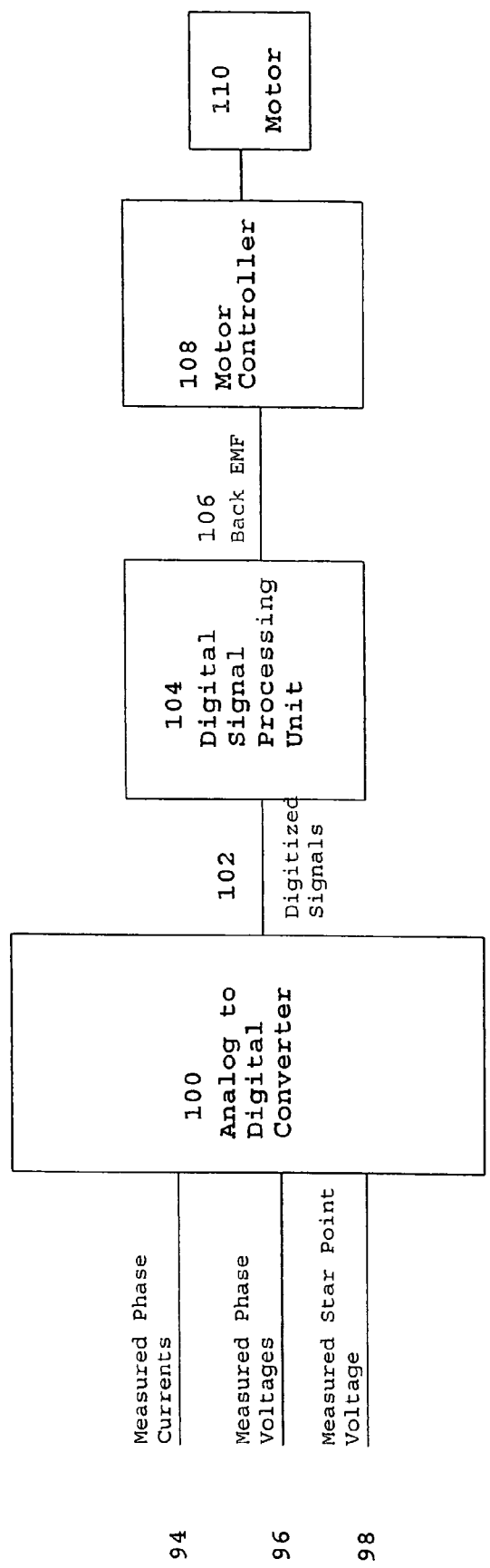
Figure 5: Sample Block Diagram of a Digital Implementation

METHOD AND APPARATUS FOR MOVABLE ELEMENT POSITION DETECTION IN AN ELECTRICALLY COMMUTATED MACHINE

RELATED APPLICATION

Provisional application No. 60/508,412, titled "Sensorless Sinewave Drive" filed Oct. 2, 2003, inventors Haroon I. Yunus, Russel H. Marvin, Bumsuk Won, incorporated herein by reference.

BACKGROUND OF THE INVENTION

Various techniques employed in detecting the position of a movable element in an electrically commutated machine have been satisfactory in general but not completely without problems. More specifically, while the invention finds applicability in linear motors and other types of motors, for example where the movable element may follow a reciprocal particircular path, it is particularly well suited to brushless direct current (BLDC) motors. In the past, rotor position in BLDC motors has been detected using devices such as Hall sensors or encoders. If the rotor position is calculated using various motor quantities such as voltage and current, the detection scheme is called "sensorless." Since the use of sensors adds to the cost of the device, the sensorless method is typically a more desirable implementation. Current sensorless methods utilize a six-step drive which activates two of the three legs of an inverter at any given time while the non-active leg is utilized in calculation of the rotor position. When using drive schemes such as sine wave drive, all legs of the inverter are active during the time the motor is driven. Information relevant to attempts to address these problems can be found in U.S. Pat. No. 6,252,362 B1. However, this reference suffers from the disadvantage of having discontinuities introduced into the drive waveform timed to coincide with back electromagnetic force(BEMF) zero crossings.

It is the general object of the present invention to provide an improved method of detecting the position of the movable element of an electrically commutated machine where the position can be detected with an arbitrary waveform applied to drive the machine without the introduction of discontinuities into the drive waveform.

SUMMARY OF THE INVENTION

In fulfillment of the aforementioned objects and in accordance with the present invention, the method of the invention comprises the steps of determining the applied voltage, current, resistance, and inductance of at least one phase and then calculating the position of the movable element from the applied voltage, current, resistance and inductance.

The values of the applied voltage, current, resistance, and inductance of each phase can be determined using several different methods. The applied voltage of a phase can be measured directly or inferred with the knowledge of the supplied bus voltage and the percentage of the duty cycle of the pulse width modulation (PWM) waveform applied to the phase. Similarly, the current in a phase can be determined by direct measurement or inferred by measuring the voltage across the phase and calculating the current in the phase with knowledge of the resistance of the phase. The inductance and resistance are quantities that are determined during the development and manufacture of the machine. The resistances of the phases of the machine remain substantially constant. The inductances of the phases of the machine are assumed to remain substantially constant. For brushless direct current (BLDC) motors and similar machines this is a valid assumption since the air gap between the rotor and the stator is fairly constant. In BLDC motors, the star point voltage can be measured directly or calculated using the applied voltage, the phase resistance, and phase inductance.

DESCRIPTION OF THE DRAWINGS

FIG. 5 is a sample block diagram of a digital implementation.

DESCRIPTION OF PREFERRED EMBODIMENTS

Figure 1:
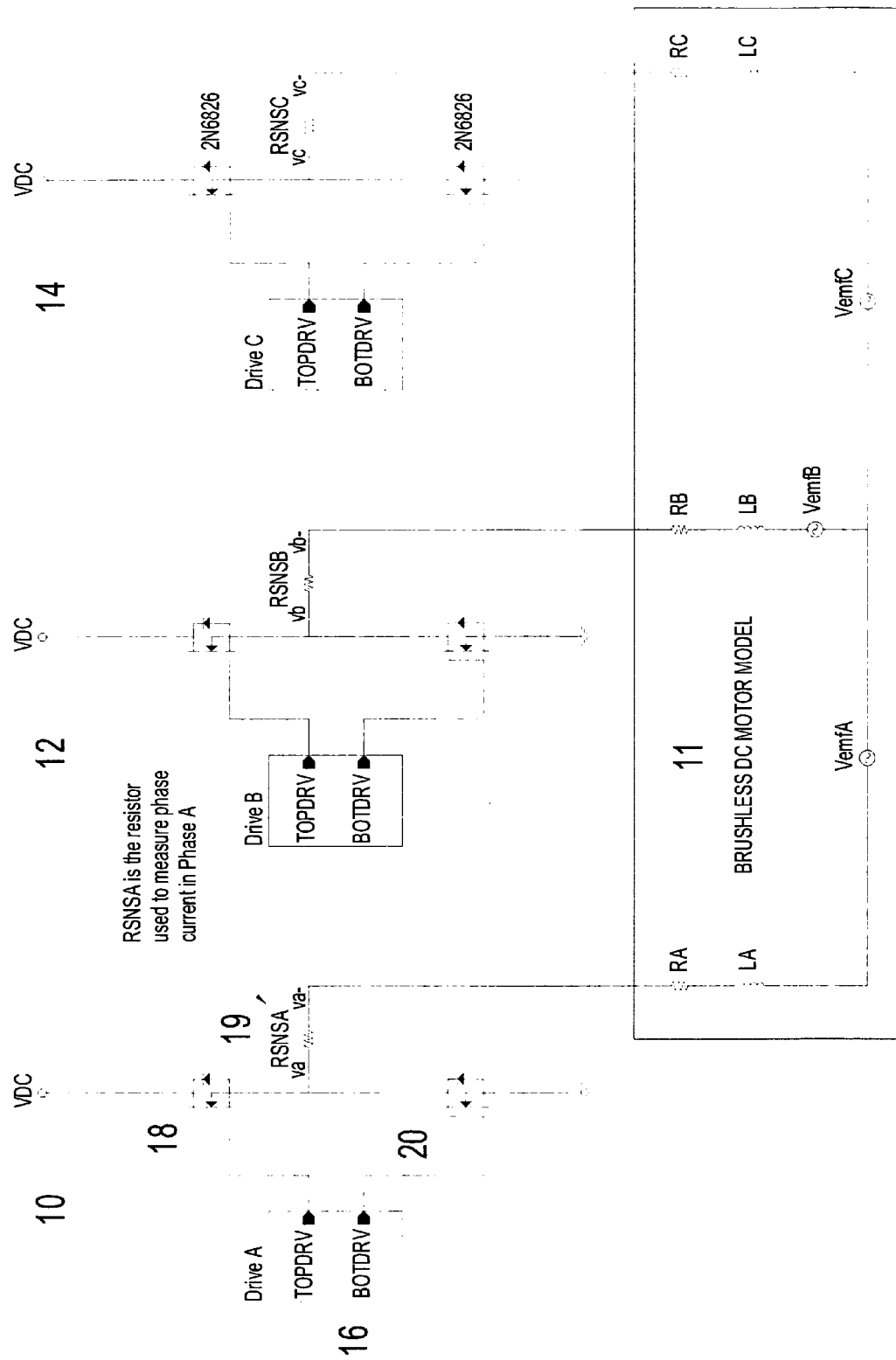
FIG. 1 of the drawings is the electrical equivalent of a three phase brushless direct current (BLDC) motor and the connections to a typical inverter used to energize the phases of the motor.

The motor model, 11, as shown in FIG. 1 is used extensively in detecting the position of the movable element of a machine driven with waveforms that require all legs to be active simultaneously. A conventional inverter comprised of identical circuits 10, 12, and 14 is used to drive the three phase BLDC motor. Since circuits 10, 12, and 14 are identical, only circuit 10 will be described in complete detail as follows. Drive A 16 receives a signal which urges it to turn on either the high side drive 18 or the low side drive 20. An analog or digital control unit will determine what high and low side drives of circuits 10, 12 and 14 need to be energized in order to drive the motor. Current will flow into one of the motor phases from a high side drive and out another phase into a low side drive depending on the position of the motor. The electrical quantities in a three-phase brushless direct current (BLDC) motor can easily be modeled using the following equations:

$$v_a - r_a i_a - L_a \frac{di_a}{dt} - vemf_a = v_n$$

$$v_b - r_b i_b - L_b \frac{di_b}{dt} - vemf_b = v_n$$

$$v_c - r_c i_c - L_c \frac{di_c}{dt} - vemf_c = v_n$$

Where $v_a$, is the voltage applied on the terminal of the motor $r_a$ is the resistance, $L_a$ is the inductance, $vemf_a$ is the back electromagnetic force (BEMF), $i_a$ is the current. All these quantities refer to phase A of the motor. Quantities with b and c subscript refer to phases B and C of the motor respectively. $v_n$ is the star point voltage of the motor. Note that in the above equations, it is assumed that the inductance is substantially constant as a function of the rotor position. For BLDC, this is a valid assumption since the air gap between the rotor and the stator is fairly constant. In BLDC based drives, the applied voltage, the phase resistance and inductance are known, and the star point voltage $v_n$ can be calculated via these known quantities or measured directly. The above equations can be solved to compute the BEMF. The zero crossing of the BEMF will provide Hall like signals estimating the rotor position in 60 Degree resolutions. In contrast, if the complete BEMF waveform is utilized, the rotor position can be estimated similar to an encoder or a resolver sensor.

The equations can be implemented in analog or digital circuitry. Whether to implement in analog or digital, is a system level decision based upon cost and performance optimization. The preferred embodiment of the present invention is implemented using the following steps. Note these steps have to be repeated for all phases.

Figure 2:
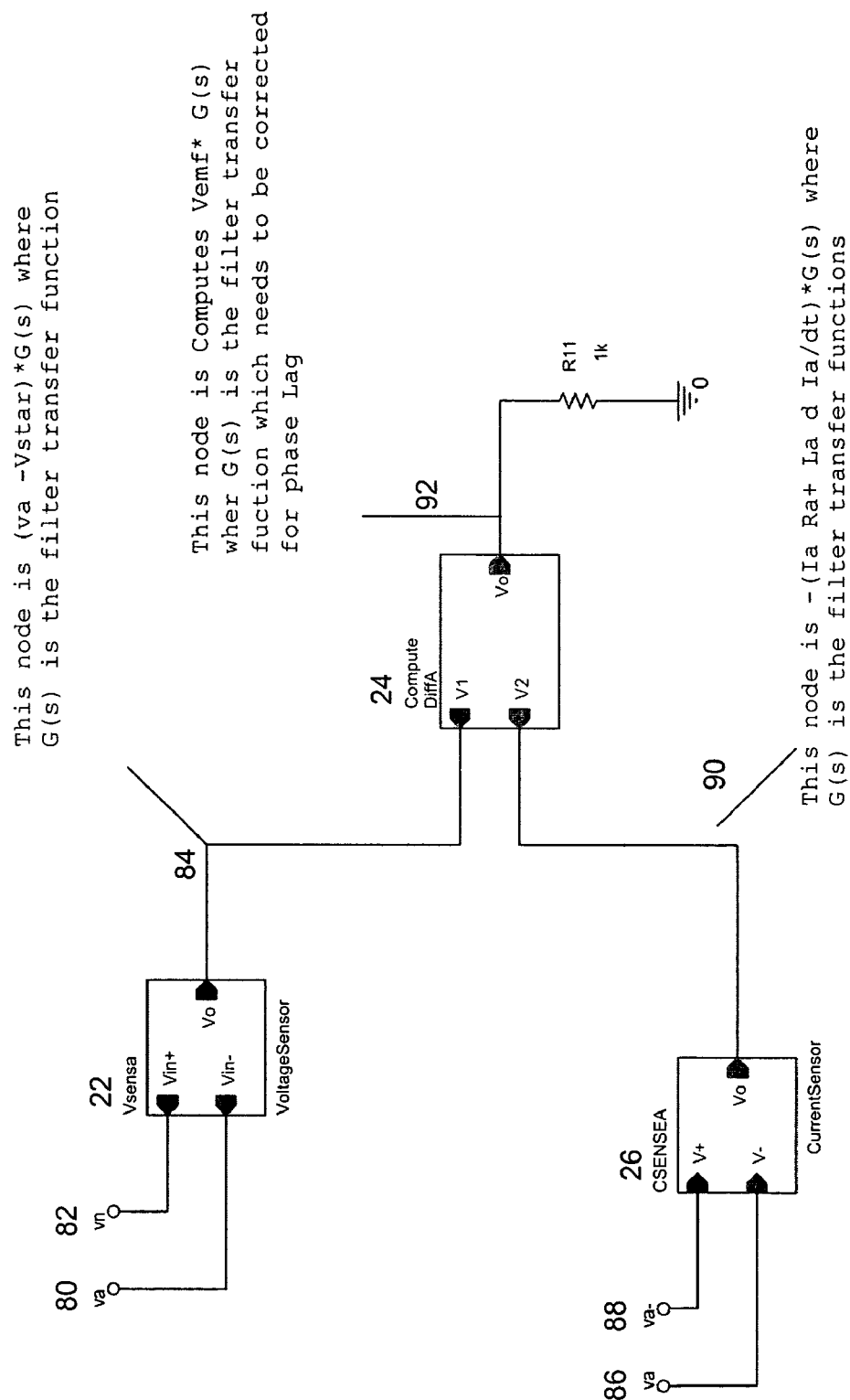
FIG. 2 is a sample block diagram to compute the back electromagnetic force (BEMF)
Figure 3:
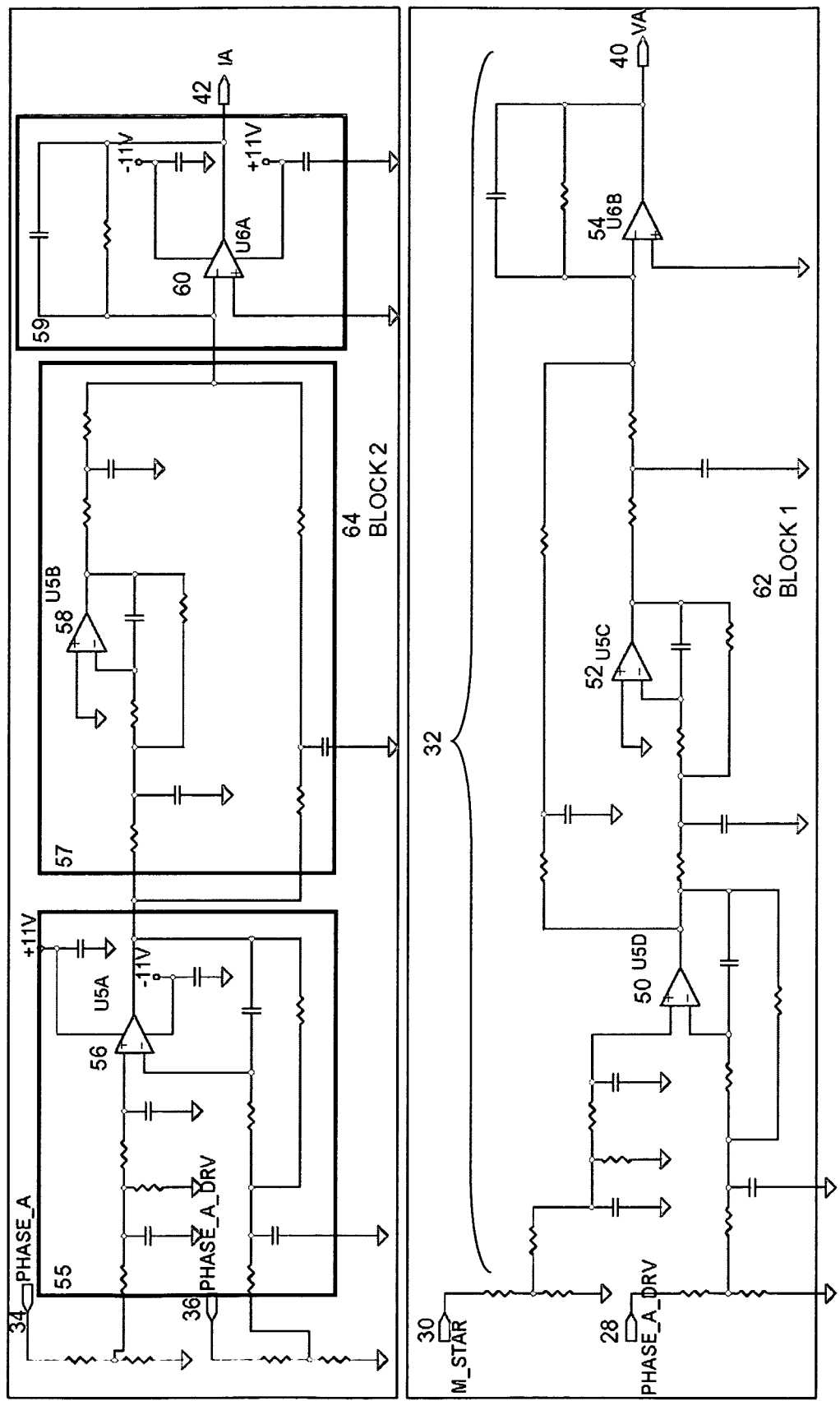
FIG. 3 is the preferred implementation of the phase voltage and phase current sense circuit for phase A of the motor.

1. Measure the applied voltage and filter it to remove switching harmonics.
2. Measure the phase current and filter it to remove switching harmonics.
3. Scale and delay the measured phase current in proportion to the resistance and inductance of the phase.
4. Measure and filter or compute the star voltage $v_n$.
5. Subtract the star voltage and the scaled and delayed phase current from the applied voltage to obtain the BEMF.
6. Correct for the BEMF phase lag introduced by the filtering.
7. Obtain the zero crossing of the BEMF by passing it through a comparator to obtain Hall like signals or estimate the rotor position based on complete waveforms The preferred embodiment is an analog implementation to provide sensor-less sine wave drive. In this implementation, special consideration is given to the filtering process. Filters not only eliminate switching noise, but must also have a constant group delay. This ensures that the wave shape of the measured quantities are preserved as they are filtered. These filters are easily implemented via conventional operational amplifiers. In FIG. 2, G(s) represents a conventional operational amplifier based low pass analog filter with a constant group delay. The voltage sensor 22 uses va 80 and vn 82 to produce the signal va−vn*G(s) 84. The current sensor 26 uses va 86 and −va 88 to produce the signal−(Ia Ra+La d Ia/dt)* G(s) 90. The Compute DiffA block 24 sums the signals 84 and 90 to produce G(s)[va−vn−Ia Ra−La d Ia/dt] 92. In FIG. 3, Block 1 implements the difference between the phase voltage 28 and the star point 30 and passes it through a conventional operational amplifier based filter 32 with the transfer function G(s). In Block2, phase current 34 is measured through a sense resistor 19. This current is passed through a conventional filter 55 with the transfer function G(s). The DC bias is calculated 57 and removed 59. Next, the filtered phase current is scaled and delayed according to motor's known characteristic resistance and inductance. This process is also implemented via conventional operational amplifier circuitry. The output of Block1 62, which is VA 40, is scaled in Block3 66. The outputs of Block1 62 and Block3 66 are filtered and subtracted in Block4 68 to provide the BEMF 46. This calculated BEMF waveform is time delayed from the motor BEMF. The time delay is a function of the filter G(s). The zero crossing of the BEMF is obtained by passing it through a conventional comparator circuit Block5 70. The output of the comparator 72 is fed into a microprocessor. The microprocessor can then correct for the time delay introduced by the filter G(s), and drive the motor by applying a sine wave. Note, in addition to filter corrections, the microprocessor can also introduce further time advance or delay to improve the efficiency of the motor. Hence, we have implemented a sine wave drive in a "sensor-less" fashion, as if we had Hall Sensors on the motor. Since the Hall Sensor are accurate within 60 Degrees, the Sine Wave produced by the microprocessor needs to be adjusted each time the comparator provides a zero crossing to it. If better resolution is desired, then the complete computed BEMF needs to be fed into the microprocessor.

Figure 4:
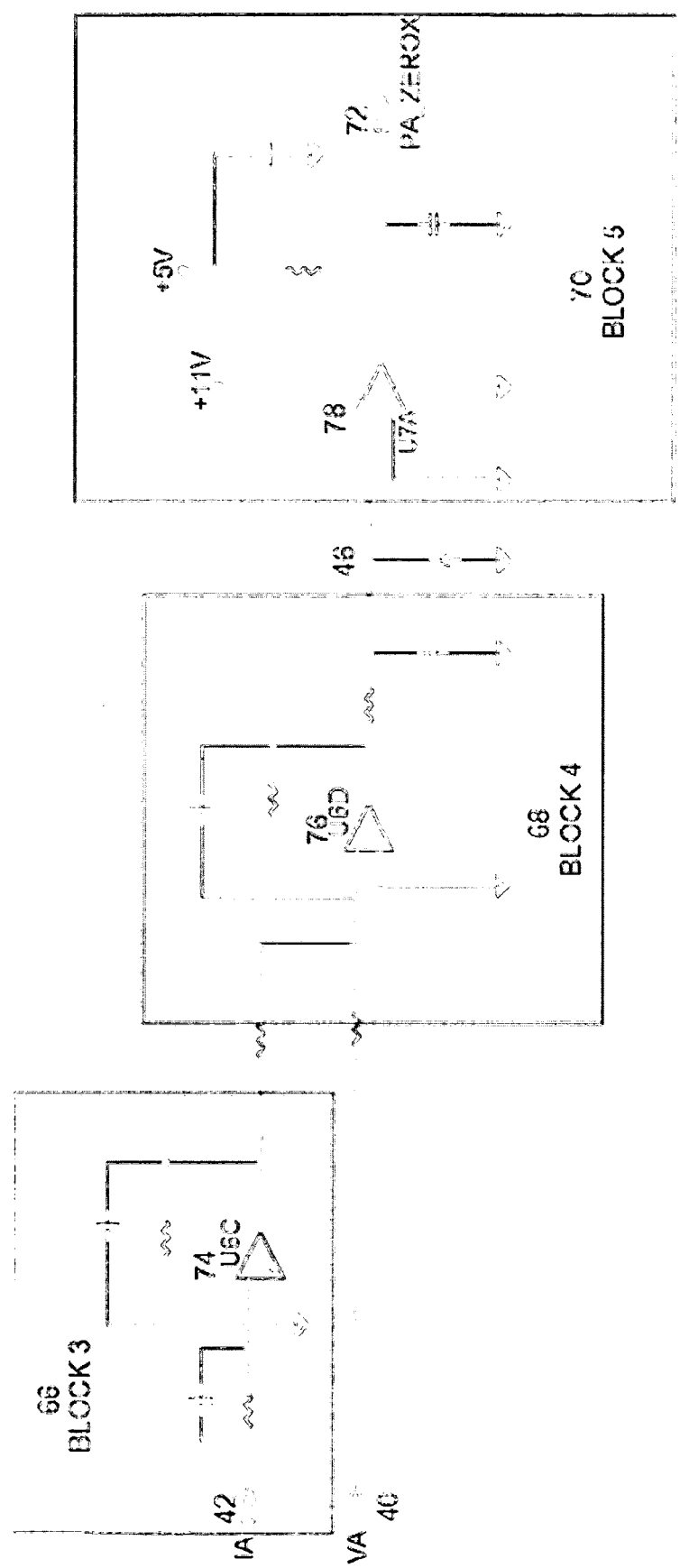
FIG. 4 is the preferred implementation of the BEMF zero cross computation circuit for phase A of the motor.

FIG. 3 and FIG. 4 show the preferred embodiment of the concept for computing the BEMF of phase A. Operational amplifiers, OPAMP, U5D 50 in Block1 62 of FIG. 3 takes the applied voltage on Phase A, PHASE_A_DRV 28, and the motor star point voltage, M_Star 30, subtracts it and filters it using a multiple feed back, MFB, Bessel Filter. OPAMP U5C 52 and U6B 54 remove any DC-Bias in the above calculation to provide the signal VA 40.

In Block2 of FIG. 3, the phase current is obtained by measuring the voltage, PHASE_A 34 and PHASE_A_DRV 36 across a sense resistor 19 in Phase A. This measured voltage is then filtered via OPAMP U5A 56 which implements the same Bessel Filter transfer function as U5D 50. OPAMPS U5B 58 and U6A 60 remove any DC-BIAS is this calculation to provide the signal IA 42.

The measured phase current IA 42 is then fed to Block3 66 of FIG. 4. OPAMP U6C 74 then scales and delays IA 42 in proportion to the motor resistance and inductance. This scaled and delayed IA 42 along with VA 40 is fed to OPAMP U6D 76 of BLOCK4 68 in FIG. 4. OPAMP U6D 76 then computes the BEMF 46 waveform of phase A. The BEMF 46 waveform is then fed to the comparator U7A 78 that computes the zero crossing of BEMF waveform PA_Zerox 72.

PA_Zerox 72 along with PB_Zerox and PC_Zerox are fed to the microprocessor where they are used to generate Sine Wave Drive. Note the microprocessor compensates for the time lag introduced by the Bessel Filter in the calculation of the BEMF waveforms. Additionally, it can advance or retard the sine wave based on these zero crossing to improve the efficiency of the motor drive.

The method of the invention can be implemented using digital components as shown in FIG. 5. The phase voltages 94, phase currents 96, and star point voltage 98 are input to an analog to digital converter 100 to digitize the signals. The analog to digital converter can be a separate component or part of the digital signal processing unit 104. The digital signal processing unit 104 performs the operation of generating the BEMF 106 signals using the digitized signals 102. The BEMF signals 106 are used by the motor controller 108 to drive the motor 110. The selection of the digital components for digital implementation is a system level decision based upon cost and performance optimization.

What is claimed is:

1. A method for detecting the position of a movable element for use in an electrically commutated machine driven by a pulse width modulated voltage, the method comprising the steps of:

a. determining an applied voltage across at least one phase of an electrically commutated machine driven by a pulse width modulated voltage, and determining a current in the at least one phase;

b. generating a first analog signal indicating the applied voltage;

c. generating a second analog signal indicating the current;

d. filtering the first analog signal to remove switching harmonics and produce applied voltage information corresponding to a filtered first analog signal;

e. filtering the second analog signal to remove switching harmonics and produce phase current information corresponding to a filtered second analog signal;

f. scaling and delaying the phase current information in proportion to a resistance and an inductance of the at least one phase, to produce modified phase current information corresponding to scaled and delayed current information;

g. using the applied voltage information and the modified phase current information in conjunction with said resistance and said inductance to produce back EMF information corresponding to the at least one phase;

h. modifying the back EMF information to correct for a phase lag due to the filtering of the first and second analog signals, to generate modified back EMF information corresponding to the at least one phase; and i. determining a rotor position of the electrically commutated machine, based on the modified back EMF information of the at least one phase.

2. A method for detecting the position of a movable element as recited in claim 1, wherein:

the electrically commutated machine has at least three phases, said steps a-h are performed individually with respect to all of the phases, and step g comprises calculating the back EMF (BEMF) of each phase using the equation:

$$BEMF = v - ri - L\frac{di}{dt},$$

where v is the voltage applied across the phase, r is the resistance of the phase i is the current in the phase, and L is the inductance of the phase and is substantially constant with respect to rotation.

3. A method for detecting the position of a movable element for use in an electrically commutated machine as recited in claim 1, wherein the applied voltage in the at least one phase is determined by direct measurement across the phase.

4. A method for detecting the position of a movable element for use in an electrically commutated machine as recited in claim 1, wherein the applied voltage of the at least one phase is determined using the equation:

$$v = v\text{bus} \times DC$$

where v is the applied voltage across the phase, vbus is a bus voltage applied to the circuit, and DC is a duty cycle of the pulse width modulated signal applying the bus voltage across the phase.

5. A method for detecting the position of a movable element for use in an electrically commutated machine as recited in claim 1, wherein the current in the at least one phase is determined using a current sense resistor.

6. A method for detecting the position of a movable element for use in an electrically commutated machine as recited in claim 1, wherein the current in the at least one phase is determined using a current sense transformer.

7. A method for detecting the position of a movable element for use in an electrically commutated machine as recited in claim 1, wherein determining an applied voltage across the phase comprises using a star point voltage of the motor in combination with a voltage applied at a terminal of the at least one phase to determine the applied voltage across the at least one phase.

8. A method for detecting the position of a movable element for use in an electrically commutated machine as recited in claim 7, wherein the star point voltage of the motor is inferred using the voltages applied at terminals of all the phases.

9. A method for detecting the position of a movable element for use in an electrically commutated machine as recited in claim 2, wherein analog components are used to produce the back EMF information.

10. A method for detecting the position of a movable element for use in an electrically commutated machine as recited in claim 2, wherein digital components are used to produce the back EMF information.

11. A method for detecting the position of a movable element for use in an electrically commutated machine as recited in claim 1, wherein determining the rotor position comprises comparing the modified back EMF information to a threshold voltage substantially equivalent to a zero crossing voltage of the at least one phase.

12. A method for detecting the position of a movable element for use in an electrically commutated machine as recited in claim 1, wherein determining the rotor position comprises comparing the modified back EMF information of the at lease one phase with an array of values in proportion to a desired resolution.

13. A method for detecting the position of a movable element for use in an electrically commutated machine as recited in claim 1, wherein motion of a movable element linked to the rotor position is linear.

14. A method for detecting the position of a movable element for use in an electrically commutated machine as recited in claim 1, wherein motion of a movable element linked to the rotor position is parti-circular.

15. The method of claim 1 wherein:

determining the current in the at least one phase comprises measuring a difference in voltage across a known resistance along the at least one phase.

16. The method of claim 1 wherein:

scaling and delaying the phase current information comprises using an operational amplifier to scale and delay the second analog signal to generate a modified second analog signal.

17. The method of claim 16 wherein:

generating the back EMF information comprises providing the modified second analog signal and the filtered first analog signal to an operational amplifier configured in accordance with said resistance and said inductance to generate the back EMF information.

18. The method of claim 1 wherein:

the step of scaling and delaying the phase current information comprises converting a filtered second analog signal to digital information, and producing the applied voltage information comprises converting the filtered first analog signal to digital information; and generating the modified phase current information, producing the back EMF information and generating the modified back EMF information comprise digitally processing the applied voltage information and the modified current information.

19. A system for detecting rotor position suitable for use in an electrically commutated permanent magnet motor, the system comprising:

a. a first circuit component adapted for an electrical coupling to an inverter of an electrically commutated motor driven by a pulse width modulated voltage, to generate a first analog signal as a function of an applied voltage across at least one phase of the motor, and further adapted to filter the first analog signal to remove switching harmonics and thereby generate a filtered first analog signal indicating the applied voltage;

b. a second circuit component adapted for electrical coupling to the inverter, to generate a second analog signal as a function of a current in the at least one phase and further adapted to filter the second analog signal to remove switching harmonics and generate a filtered second analog signal indicating the phase current;

c. a signal delay component coupled to receive phase current information corresponding to the filtered second analog signal and to apply a scaling and delaying function to the phase current information in proportion to a resistance and an inductance of the at least one phase, thereby to generate modified phase current information equivalent to the filtered second analog signal scaled and delayed;

d. a first processing component coupled to receive phase voltage information corresponding to the filtered first analog signal and to receive the modified phase current information, and adapted to use the phase voltage information and the modified phase current information in conjunction with said resistance and said inductance to generate back EMF information corresponding to the at least one phase;

e. a second processing component coupled to receive the back EMF information and adapted to correct the back EMF information for a phase lag due to the filtering of the first analog signal and the second analog signal by the first and second circuit components, respectively, and thereby generate modified back EMF information; and f. a third processing component coupled to receive the modified back EMF information and generate rotor position information based on the modified back EMF information.

20. The system of claim 19 wherein:

the motor comprises at least three phases, and each of the first and second circuit components, the signal delay component, and the first, second, and third processing components, comprises a plurality of the components, one component associated with each of the phases.

21. The system of claim 19 wherein:

the first circuit component comprises means for determining the applied voltage based on a star point voltage of the motor in combination with a voltage applied at a terminal of the at least one phase.

22. The system of claim 19 further including:

means for comparing the modified back EMF information to a zero crossing value, to identify episodes when the modified back EMF and the zero crossing value coincide.

23. The system of claim 19 wherein:

the signal delay component comprises a first operational amplifier adapted to scale and delay the filtered second analog signal to produce a modified second analog signal; and the first processing component comprises a second operational amplifier configured according to said resistance and said inductance to generate the back EMF information as an analog signal.

24. The system of claim 19 further including:

analog-to-digital conversion components operable respectively on the first and second filtered analog signals to generate the phase current information and the phase voltage information as digital information, wherein the signal delay component and said processing components are provided as digital information processing components.

25. The system of claim 19 wherein:

the second circuit component comprises means for determining a voltage difference across a known resistance along the at least one phase.

* * * * *